April 26, 1932. A. N. BURKHOLDER ET AL 1,855,221
FRUIT JUICE EXTRACTOR
Filed Feb. 21, 1930 2 Sheets-Sheet 2
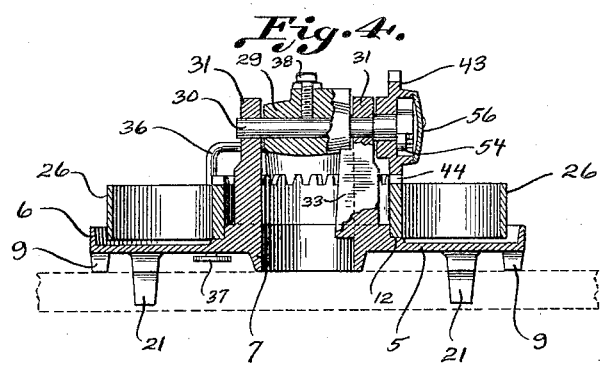
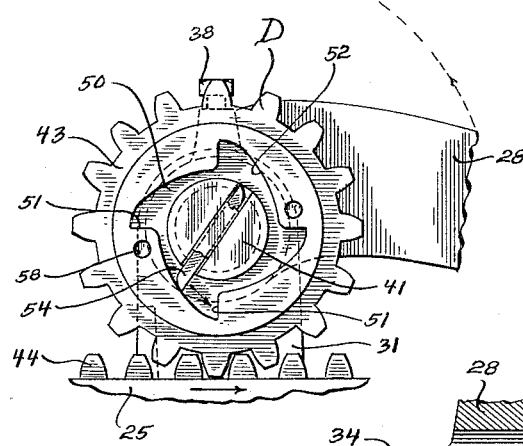
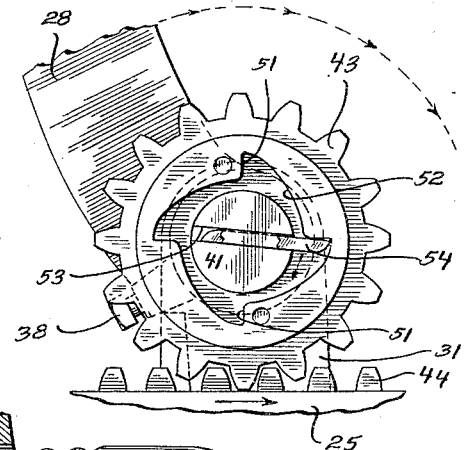
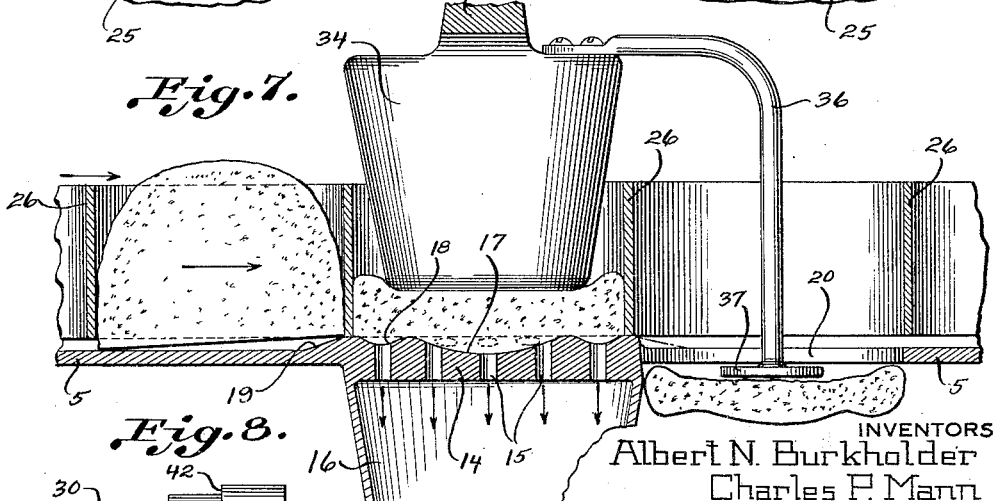
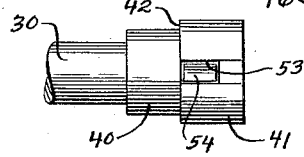
INVENTORS
Albert N. Burkholder
Charles P. Mann
BY Lancaster Allwine and Rommel
ATTORNEYS.

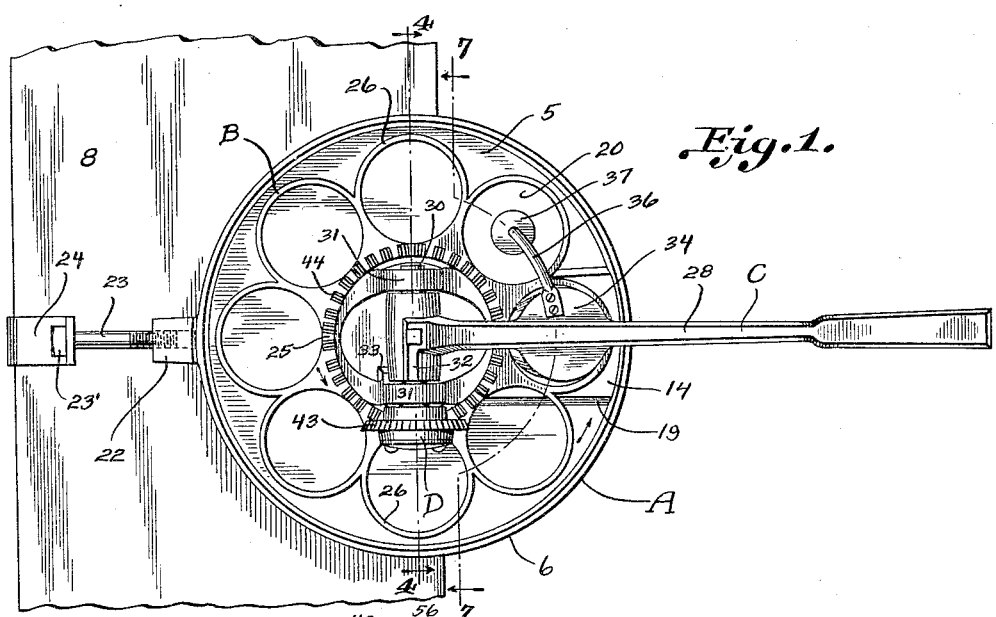
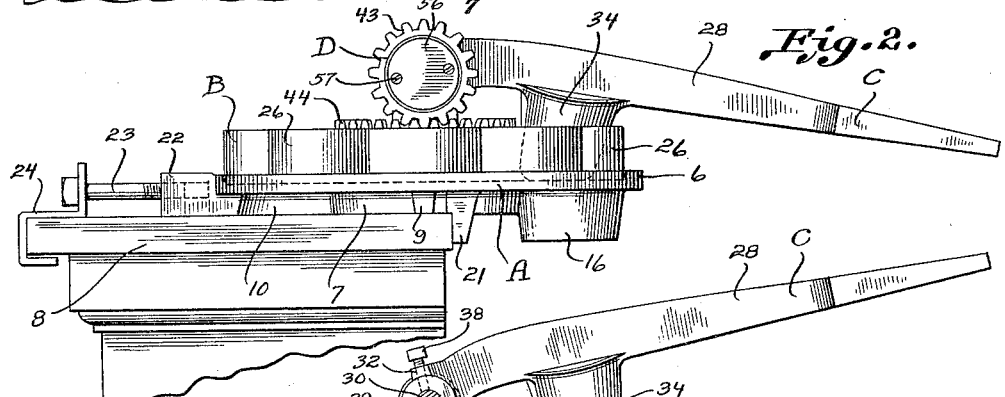
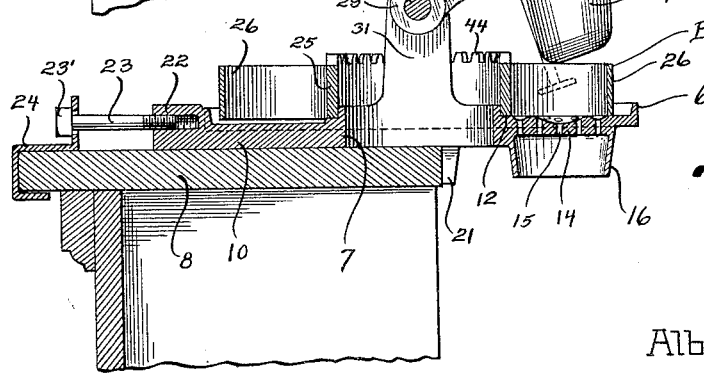

Patented Apr. 26, 1932

1,855,221

UNITED STATES PATENT OFFICE

ALBERT N. BURKHOLDER AND CHARLES P. MANN, OF SOUTH JACKSONVILLE, FLORIDA, ASSIGNORS TO SQUEEZE EASY INC., OF SOUTH JACKSONVILLE, FLORIDA, A CORPORATION OF FLORIDA

FRUIT JUICE EXTRACTOR

Application filed February 21, 1930. Serial No. 430,378.

The present invention relates to juice extractors for citrous fruits and the primary object of the invention is to provide a device of this character which will be efficient and extremely desirable for use for quickly extracting juice from the fruits with a minimum amount of labor.

A further object of the invention resides in the provision of a fruit juice extractor embodying a rotatable member adapted to receive preferably halved fruit with means for successively bringing the fruit to a juice extracting position.

A further object of the invention is to provide a device of this character embodying a series of annularly arranged fruit receiving pockets which are successively brought into operative relation to a plunger or presser carried by a pivoted handle which thru upward swinging movement acts to automatically rotate the annular series of pockets with a step by step motion.

A further object resides in the novel arrangement whereby the fruit after having the juice extracted therefrom is automatically ejected from the device.

A still further object is to provide a fruit juice extractor adapted for counter mounting in such a manner as to be firmly held in position upon the counter during operation of the extractor.

Other objects and advantages of the invention will be apparent during the course of the following detailed description, taken in connection with the accompanying drawings forming a part of this specification and in which drawings:

Figure 1 is a top plan view of the extractor shown mounted upon a shelf or counter.

Figure 2 is a side elevation of the extractor.

Figure 3 is a section thru the extractor longitudinally of the handle.

Figure 4 is a section substantially on the line 4—4 of Figure 1.

Figure 5 is an enlarged fragmentary detail view showing the position of the ratchet when the handle is in a presser position.

Figure 6 is a similar view showing the ratchet wheel having been rotated thru upward swinging of the handle.

Figure 7 is an enlarged fragmentary detail view substantially on the line 7—7 of Figure 1 and showing the manner in which the ejector is carried by the presser block.

Figure 8 is a fragmentary view of one end of the shaft for mounting of the ratchet and handle.

In the drawings, and wherein similar reference characters designate corresponding parts thruout the several views, the extractor has been shown constructed for mounting upon a counter or the like and embodies a main frame A on which is mounted a rotary carrier B. The letter C designates a presser means for squeezing juices from the fruit arranged in the rotary carrier B, and D rotating means operable by actuation of the means C for imparting step by step rotary movement to the carrier B.

The main frame A includes a disc-shaped base plate 5 having an upstanding retaining flange 6 about its peripheral edge. The base plate 5 is formed with an axially disposed hollow hub portion 7 which as will be observed in Figures 3 and 4 projects above and below the plate. The downwardly projecting portion of the hub forms a rest portion for engagement with the upper surface of the counter 8. Arranged diametrically of the hub 7 are suitable feet 9 for engagement with the counter top at opposite sides of the hub portion. Extending rearwardly from the hub 7 beneath the plate 5 is a rib 10 which is also adapted to rest upon the counter top 8 and co-act with the feet 9 for preventing tilting of the extractor.

The upwardly projecting portion of the hub 7 is formed with an annular ring seat 12 for rotatably supporting the carrier B above the disc-shaped base plate 5.

At the forward or operating side of the extractor, the base plate is formed with a raised strainer portion 14 provided with a series of perforations 15 thru which the extracted juice passes and is guided by the funnel-shaped extension 16 into a glass or other suitable receptacle. This raised strainer portion 14 has its upper surface of special formation and is formed at its axial center with a concavity 17 about which is concentrically arranged an annular depression 18. As shown in Figures 3 and 7, the upper surface of the strainer portion 14 is arranged parallel to and spaced above the upper surface of the flat base plate 5 with the upper surface of the strainer portion on a line with the annular ring seat 12. At the approach side of the strainer portion 14, considering the direction of rotation of the carrier B, is an inclined surface 19. This inclined surface 19 serves to guide the fruit onto the strainer portion as clearly illustrated in Figure 7.

At the rear side of the raised strainer portion 14, relative to the direction of rotation of the carrier B, the plate 5 is provided with a discharge opening 20 thru which the pressed fruit skins are ejected.

While the extractor may be constructed for mounting in any preferred manner, in the example shown the base plate 5 is provided with a pair of depending lugs 21 which are arranged slightly forward of the feet 9 and in parallel alignment with the feet. These lugs 21 are of greater length than the feet 9 and are intended to engage against the rear edges of the counter top 8. These lugs 21 are so arranged that when the lugs are in engagement with one edge of a counter or shelf, the funnel extension 16 and the discharge opening 20 will be disposed beyond the edge of the counter or shelf. Thus it will be seen that the extractor is intended to be mounted with a substantial portion of the disc-shaped base plate 5 extended beyond the edge of the mounting for the extractor. This arrangement is to permit ready placing of a glass or other suitable receptacle under the funnel extension 16 and also allow for the ejected fruit skins to be deposited into a suitable receptacle.

At the rear end of the rib 10, the main frame A is formed with a boss 22 provided with a threaded socket for threaded reception of the shank of a clamping bolt 23 having its head 23' acting against an upstanding portion of a substantially S clamp 24 adapted to engage over the front edge of the counter top 8 as clearly shown in Figure 3. Threading of the clamping bolt into the boss 22 will draw the lugs 21 into firm engagement with the inner edge of the counter top and thus effectively mount the extractor for use.

Referring now to the rotary carrier B for receiving the fruit from which the juice is to be extracted, the same embodies a mounting ring 25 for bearing engagement upon the annular ring seat 12. Arranged in circular formation about the mounting ring 25 is a series of tubular holders or cups 26 for receiving the fruit from which the juice is to be extracted. These tubular holders or cups 26 are arranged with their lower edges flush with the bottom or bearing edge of the mounting ring 25 so that the lower edges of the holders are parallel with the upper surface of the raised strainer portion 14 and slightly spaced above the upper surface of the base plate between the strainer portion. This manner of mounting the tubular holders in spaced relation above the base plate decreases the bearing surface of the carrier and reduces friction so that the carrier may be easily rotated thru operation of the means D. As will be observed in Figures 3 and 7, the holders 26 have their lower edges engaging the upper surface of the strainer portion 14 about the annular depression 18 and thus prevent loss of the extracted juice during the squeezing operation.

The means C embodies an operating lever or handle 28 having its head 29 mounted on a rock shaft 30 journaled at its ends in the upper ends of a pair of mounting arms 31 cast integral with the main frame hub portion 7. These upstanding mounting arms 31 project upwardly thru the mounting ring 25 for mounting of the lever 28 above the rotary carrier B. The arms 31 are arranged in alignment diametrically of the base plate with the supporting feet 9 and at a right angle to the diametric location of the raised strainer portion 14. The lever head 29 is formed with a shoulder 32 which abuts with the upper end of a stop projection 33 preferably cast integral and extending inwardly from one of the mounting arms 31. This shoulder 32 and stop 33 serves to limit upward swinging movement of the lever 28 beyond a position slightly beyond dead center so that the lever may be released and remain in a substantially upright position. This upward position of the lever is shown in Figure 6.

Carried by and preferably cast integral with the lever 28 is a substantially frusto-conical shaped presser plug or block 34 of a size, and so located from the pivot shaft 30 as to have movement into a tubular holder aligned above the strainer portion 14 when the lever is lowered. It is preferred that the fruit from which the juice is to be extracted be cut in half as shown in Figure 7 with one of the halves placed in each tubular holder 26 with the cut facing downwardly and in confronting relation to the upper surface of the base plate 5. With the fruit in such position it will be seen that when the plug 34 is lowered the fruit will be pressed against the strainer portion 14 and the juice extracted therefrom and allowed to pass thru the perforations 15.

Carried by and preferably secured to the upper side of the presser plug 34 at one side of the lever 28 is an L-shaped ejector arm 36 which when the lever 28 is lowered, is adapted to pass thru the tubular holder which has just moved from a position above the strainer portion 14 for ejecting the fruit skin thru the discharge opening 20. The depending portion of the arm 36 is of greater length than the plug 34 and preferably carries at its lower end a disc-shaped head 37 which engages the fruit skin and forces the same from the holder thru the discharge opening 20. Thus it will be seen that as the juice is being extracted from the piece of fruit in the holder above the strainer portion 14 that the piece of fruit from which the juice has just previously been extracted is being ejected from the carrier thru the base plate 5. The hook-shaped attaching clamp 24 will prevent upward tilting of the extractor when the lever 28 is swung downwardly for extracting the fruit juice.

Referring now to the rotating means D for rotating the carrier B with a step by step movement whereby the annular series of tubular holders 26 are successively brought into registering relation above the strainer portion 14, this rotary movement is to be imparted to the carrier thru the mere upward swinging movement of the lever 28. The shaft 30 is freely rotatable in the arms 31 and the head 29 of the lever 28 is adjustably fixed to the shaft by means of a set screw 38. When the set screw 38 is tight upon the shaft 30 the head 29 will prevent longitudinal movement of the shaft and cause a rocking movement to be imparted to the shaft upon upward and downward swinging of the lever 28.

One end of the shaft 30 is provided with an enlarged bearing portion 40 beyond which is formed a still further enlarged head portion 41 providing a stop shoulder 42. This bearing portion 40 has freely mounted thereon a pinion 43 for meshing with teeth 44 formed about the upper edge of the annular mounting ring 25.

Formed in the outer face of the pinion 43 is a pocket 50 formed with four stop shoulders 51 connected by the cam surfaces 52. This shallow pocket 50 receives the head 41 of the shaft 30 whereby the annular shoulder 42 serves to retain the pinion 43 against longitudinal movement off the bearing portion 40. The head portion 41 is provided with a transverse way 53 for slidably receiving a gravity actuated pawl 54 adapted to engage the shoulders 51 for imparting rotation to the pinion 43 in one direction upon raising of the lever 28. The pawl 54 has free sliding movement thru the transverse way 53 and when the lever 28 is in its lowered position as in Figure 5 the pawl is allowed to drop by gravity to a position for engagement with one of the stop shoulders 51 when the lever is raised. In the example shown, the four stop shoulders 51 are spaced an equal distance apart about the shaft head 41. A cover plate or cap 56 may be secured over the face of the pinion 43 for covering the pocket 50 and this cover 56 may be held in position by means of screws 57 threaded into tapped holes 58.

A limited amount of lost motion is provided between the rock shaft 30 and pinion 43 to compensate for the variation in the size of the fruit from which the juice is being extracted and further to permit the plug 34 and ejector disc 37 to clear the holders 36 prior to imparting of any rotation to the carrier B. The shaft 30 has a limited rocking movement thru approximately 130° of rotation. In Figure 5 the lever 28 has been shown in its lowered position and in which position it will be noted that the lower end of the gravity actuated pawl 54 has been moved in a clockwise direction for a substantial distance beyond the lowermost stop shoulder 51. Upon upward swinging of the lever 28, reference being had to Figure 5, in the direction of the dotted line, the head 41 will be rotated in a clockwise direction for substantially 30° before the pawl 54 abuts against the lowermost stop shoulder for imparting rotation to the pinion 43. When the shaft 30 has been rotated until the pawl 54 engages the lowermost stop shoulder 51, the lever 28 will be raised for a distance slightly greater than shown in Figure 3 until the ejector disc 37 has cleared the upper edge of the annular series of holders 26. From this position, the pinion 43 is rotated by the pawl 54 thru 90° of rotation into a position as shown in Figure 6 and the gear ratio between the pinion 43 and annular series of teeth 44 is such as to rotate the carrier for one-eighth of a complete revolution, there being eight of the tubular holders 26. This one-eighth rotation of the carrier disposes a loaded holder in position over the strainer portion 14. The lever 28 is of course raised to a position whereby the shoulder 32 abuts against the stop 33. The lever 28 is then moved downwardly in the direction of the dotted line arrows in Figure 6 whereby the pawl 54 will be moved longitudinally as the end of the pawl slides along one of the cam surfaces 52 and drops by gravity behind the lowermost stop shoulder 51. Continued downward swinging of the lever compresses the fruit in the tubular holder overlying the strainer portion 14 and at the same time the ejector arm 36 discharges the pressed fruit skin from the next adjacent holder. By comparing Figures 5 and 7 it will be seen that should the piece of fruit shown beneath the block 34 be considerably thicker it will not prevent the pawl 54 from moving past the proper stop shoulder since the pawl passes the lowermost stop shoulder at about the time that the lower end of the block engages the piece of fruit to be pressed.

The parts of the device may be formed of any suitable material of a non-corrosive nature and as will be observed the device embodies but four preferably cast major portions including the main frame A, the rotary carrier B, the ratchet forming pinion 43 and the presser means C. This simple construction not only provides for cheap and economical manufacture of the extractor but also permits easy and thorough cleaning of the device.

As before stated, the device may be mounted for use in any other preferred manner so long as the device is mounted with the funnel-shaped extension 16 and discharge opening 20 readily accessible for proper collection of the juice in a suitable receptacle and the ejected fruit skins permitted to be discharged thru the base plate.

From the foregoing description it will be apparent that a novel and improved construction for extractors for extracting juices from citrus fruits has been disclosed embodying a series of annularly arranged tubular holders for receiving the fruits with means for successively bringing the holders into a juice extracting position. It will also be apparent that a novel arrangement has been disclosed whereby the independent holders for the fruit are successively brought into a juice extracting position by the mere rocking movement of the operating lever. A further advantage resides in the lost motion arrangement compensating for various sizes of pieces of fruit placed in the holders 26 and preventing rotation of the carrier until the presser plug and ejector disc have cleared the carrier on the upward swinging movement of the lever.

Changes in detail may be made to the form of invention herein shown and described, without departing from the spirit of the invention or the scope of the following claims.

We claim:

1. A fruit juice extractor comprising a main frame including a flat base plate having a strainer portion, a carrier rotatably mounted upon the upper side of the base plate embodying an annular series of tubular fruit holders for successive alignment above the strainer portion, a presser lever, a presser block carried by the lever and movable into one of the holders aligned above the strainer portion when the lever is lowered, means carried by the lever for removing the pressed fruit from the carrier, and means for imparting partial rotation to the carrier upon upward movement of the lever for successively aligning the holders above the strainer portion.

2. A fruit juice extractor comprising a main frame including a flat base plate having a strainer portion and a discharge opening to one side of the strainer portion, a carrier rotatably mounted upon the upper side of the base plate embodying a series of annularly arranged tubular fruit holders for movement first in alignment above the strainer portion and then above said opening, a presser lever pivotally carried by the base plate, a presser block carried by the lever and movable into one of the holders aligned above the strainer portion when the lever is lowered, an ejector arm carried by the block and movable thru the holder aligned above said opening when the lever is lowered, and means operable upon upward swinging of the lever for imparting step by step rotation to the carrier.

3. A fruit juice extractor comprising a main frame including a flat base plate having a strainer portion and a discharge opening to one side of the strainer portion, a carrier rotatably mounted upon the upper side of the base plate embodying a series of annularly arranged tubular fruit holders for movement first in alignment above the strainer portion and then above said opening, a presser lever pivotally carried by the base plate, a presser block carried by the lever and movable into one of the holders aligned above the strainer portion when the lever is lowered, an ejector arm carried by the block and movable thru the holder aligned above said opening when the lever is lowered, and ratchet drive means between the lever and carrier for imparting step by step rotation to the carrier thru upward swinging of the lever and subsequent to movement of the presser block and ejector arm to a position clearing the carrier.

4. A fruit juice extractor comprising a main frame including a flat base plate having a strainer portion and an opening thru the plate at one side of the strainer portion, a carrier rotatably mounted upon the upper side of the base plate embodying a series of annularly arranged tubular fruit holders for successively aligning first above the strainer portion and then said opening, a lever pivotally mounted upon the base plate at the axis of rotation of the carrier, a presser block carried by the lever for co-acting with said strainer portion, an L-shaped ejector arm carried by the block for ejecting the crushed fruit thru said opening, and a lost motion ratchet drive means between the lever and carrier for imparting step by step rotation to the carrier upon upward limited swinging movement of the lever and subsequent to movement of the block and ejector arm upwardly out of the fruit holders.

5. A fruit juice extractor comprising a main frame including a flat base plate having a strainer portion, a carrier rotatably mounted upon the upper side of the base plate embodying an annular series of tubular fruit holders for successive alignment above the strainer portion, a presser lever, a presser block carried by the lever for movement into the holder aligned above the strainer portion when the lever is lowered, and a lost motion ratchet drive means between the lever and carrier for imparting partial rotation to the carrier subsequent to movement of the presser block out of the fruit holder thru upward swinging of the lever.

6. A fruit juice extractor for counter mounting comprising a main frame including a flat base plate having a strainer portion and a discharge opening at one side of the strainer portion, extensions beneath the base plate for horizontally supporting the base plate, a pair of spaced lugs depending below the extensions for engagement with one edge of the counter for disposing the strainer portion and discharge opening beyond the edge of the counter, clamp means connecting the main frame to the opposite edge of the counter and drawing said lugs into binding engagement with an edge of the counter, a series of annularly arranged fruit holders rotatable upon the base plate for movement over the strainer portion and discharge opening, presser means embodying a presser block for co-acting with said strainer portion and an ejector arm for discharging the pressed fruit thru said discharge opening, and means operable by the presser means for successively aligning the holders above the strainer portion.

7. In a fruit juice extractor, a disc-shaped base plate having an upstanding peripheral flange, an axially disposed annular ring seat, and a perforated strainer portion disposed between the seat and flange, a carrier embodying a mounting ring rotatable on the ring seat and a series of tubular fruit holders arranged about the mounting ring for successive alignment above the strainer portion, a rock shaft supported by the base plate within the mounting ring, a presser lever secured to the rock shaft, a presser block carried by the lever and movable into one of the holders when aligned above the strainer portion, gear teeth carried by the mounting ring, a ratchet pinion freely rotatable on the rock shaft and meshing with said teeth of the mounting ring, and a pawl rotatable with the rock shaft and co-acting with the ratchet pinion for imparting partial rotation to the ring gear upon upward swinging movement of said lever.

8. In a fruit juice extractor a disc-shaped base plate having an upstanding peripheral flange, an annular ring seat arranged concentrically within the flange and a perforated strainer portion raised above the surface of the base plate, a carrier including a mounting ring rotatable on the annular ring seat and a series of tubular fruit holders arranged about the ring for successive alignment above the strainer portion, said ring seat being flush with the upper surface of the raised strainer portion, gear teeth provided at the upper edge of the mounting ring, a horizontally mounted rock shaft supported by the base plate inwardly of the mounting ring, a lever secured to the shaft and having limited upward swinging movement, a presser block carried by the lever for co-acting with said strainer portion, a pinion freely rotatable on the rock shaft and meshing with said teeth of the mounting ring, and a ratchet drive coupling between the shaft and pinion for imparting limited rotation to the carrier upon upward swinging movement of the lever.

9. In a fruit juice extractor a disc-shaped base plate having an upstanding peripheral flange, an annular ring seat arranged concentrically within the flange and a perforated strainer portion raised above the surface of the base plate, a carrier including a mounting ring rotatable on the annular ring seat and a series of tubular fruit holders arranged about the ring for successive alignment above the strainer portion, said ring seat being flush with the upper surface of the raised strainer portion, gear teeth provided at the upper edge of the mounting ring, a horizontally mounted rock shaft supported by the base plate inwardly of the mounting ring, a lever secured to the shaft and having limited upward swinging movement, a presser block carried by the lever for co-acting with said strainer portion, a pinion freely rotatable on the rock shaft and meshing with said teeth of the mounting ring, a pocket formed in one side of the pinion formed with evenly spaced apart stop shoulders, and a pawl member rotatable with and freely slidable transversely thru the rock shaft within the pocket in the pinion and engageable with the stop shoulders upon upward swinging movement of said lever for imparting limited rotation to the carrier.

10. In a fruit juice extractor, a flat disc-shaped base plate having a hollow hub portion and an upstanding retaining ring about the peripheral edge of the plate, an annular ring seat provided on the hub portion and slightly spaced above the upper surface of the base plate, a perforated strainer portion provided in the base plate and having its upper surface parallel with the ring seat, a funnel-shaped extension depending from the strainer portion, a carrier including a ring rotatable on the ring seat and a series of tubular fruit holders arranged about the ring, gear teeth formed about the upper edge of the carrier ring, supporting arms projecting upwardly from said hub portion inwardly of the carrier ring, a rock shaft mounted horizontally in the arms, a lever affixed to the shaft between the arms, a presser block carried by the lever for co-acting with the strainer portion, a pinion freely rotatable on one end of the rock shaft outwardly of one of the supporting arms and having meshing engagement with the teeth of the carrier ring, and ratchet drive means between the shaft and pinion for imparting partial rotation to the carrier ring upon upward limited movement of the lever for successively aligning the tubular fruit holders above the strainer portion.

11. In a fruit juice extractor, a disc-shaped base plate having a raised strainer portion and a discharge opening at one side of the strainer portion, a carrier rotatably mounted upon the upper side of the base plate including an annular series of tubular fruit holders arranged to have sliding contact over the raised strainer portion and spaced above the upper surface of the base plate, a presser lever, means carried by the presser lever and co-acting with the strainer portion for extracting juice from the fruit in the holder above the strainer portion, means carried by the presser lever for ejecting the pressed fruit thru said discharge opening simultaneously with the juice extracting operation, and means for successively aligning the fruit holders above the strainer portion upon upward limit of swinging movement of the presser lever.

ALBERT N. BURKHOLDER.
CHARLES P. MANN.